United States Patent [19]

Adkisson et al.

[11] Patent Number: 4,523,203
[45] Date of Patent: Jun. 11, 1985

[54] GREY SCALE THERMAL PRINTER CONTROL SYSTEM

[75] Inventors: William M. Adkisson; Richard W. Adkisson, both of Englewood, Colo.

[73] Assignee: Honeywell Inc., Minneapolis, Minn.

[21] Appl. No.: 607,984

[22] Filed: May 7, 1984

[51] Int. Cl.³ .................................................. B41J 1/24
[52] U.S. Cl. ........................ 346/76 PH; 219/216 PH
[58] Field of Search ............... 346/76 PH, 76 R, 204, 346/202, 101; 400/120; 219/216 R, 216 PH; 250/316.1, 317.1, 318; 358/76, 283, 298

[56] References Cited

U.S. PATENT DOCUMENTS

| | | | |
|---|---|---|---|
| 3,777,116 | 12/1973 | Brescia et al. | 400/120 |
| 3,975,707 | 8/1976 | Ito et al. | 346/76 PH |
| 3,987,493 | 10/1976 | Johnson et al. | 346/76 PH |
| 4,032,925 | 6/1977 | Kos | 219/216 PH |
| 4,085,794 | 4/1978 | Mueller | 346/76 PH |
| 4,088,868 | 5/1978 | Zuethen | 219/216 PH |
| 4,113,391 | 9/1978 | Minowa | 400/120 |
| 4,262,188 | 4/1981 | Beach | 346/76 PH |
| 4,284,876 | 8/1981 | Ishibashi et al. | 400/120 |
| 4,305,080 | 12/1981 | Cunningham et al. | 219/216 PH |
| 4,364,063 | 12/1982 | Anno et al. | 346/76 PH |
| 4,366,369 | 12/1983 | Hagen et al. | 346/76 PH |
| 4,370,666 | 1/1983 | Noda et al. | 219/216 PH |

Primary Examiner—Thomas H. Tarcza
Assistant Examiner—A. Evans
Attorney, Agent, or Firm—Charles J. Ungemach

[57] ABSTRACT

A control method for thermal writing with a multiplicity of "hour glass" shaped heaters is provided which allows accurate and automatic control of multiple melt sizes in each receiving pixel. This accurate melt size for all receiving pixels is provided immediately after startup when heaters have traversed the margin area and the image is to be traversed. Changing office ambient temperature will not change the accuracy of melt size.

20 Claims, 5 Drawing Figures

GREY SCALE THERMAL PRINTER CONTROL SYSTEM

BACKGROUND OF THE INVENTION

Thermal printers found in the prior art have considerable difficulty in reliably producing a large number of grey scale values. In my co-pending application Ser. No. 607,986, filed 5-7-84 entitled "Shaped Head For Thermal Recording", and assigned to the assignee of the present invention, I disclose and claim a heater element in the form of an "hour glass" shaped resistor capable of producing a large number of different area melts, for example, 32 different grey scale values on a thermal recording medium such as a dye transfer paper and receiving sheet.

An assembly of these shaped heaters might have, for example, 2,728 of these resistors mounted in a row on a 9 to 10 inch bar so as to be useable vertically or horizontally with an 8½×11 inch of paper having white borders surrounding the image area. Such an assembly would produce 2,048 lines in the image area and if every pixel can be dependend upon for 32 precise melt sizes from each shaped heater, a palet of over 32,000 colors would be provided by each pixel, assuming the pixels are produced during three passes of the head over the paper with each pass forming one of the colors cyan, magenta, and yellow.

To obtain 32 melt sizes per pixel the area change of the melt is 3.23% for each increment going from 0 to 31 as the full pixel melt. Any single disturbance such as variations of temperature at the start of programmed heating should cause no more error than about 1% of the difference in size between the smallest dot and the largest dot, i.e., less than half of the 3.23% density change between two adjacent grey scale values. This precision is needed over the range of normal office temperatures. It is also preferable that there be a minimum warmup time required for the system.

Present two grey scale systems show objectional changes in melt size depending on past heater commands, operating time, office ambient temperature, etc. Ishibashi in U.S. Pat. No. 4,284,876 varies the width of a resistor heating pulse so as to increase or decrease the heating thereof based on the past history of heating pulses. Ishibashi is compensating for only 32 resistors, requires only one memory bit for each past history time per resistor and is not attempting a 1% compensation. Applying this approach for 2,728 resistors with 5 bits required for each history point per resistor with the other associated hardware the cost and complexity would be excessive. Furthermore, Ishibashi does not address the ambient temperature and warmup problems.

Cunningham et al. in U.S. Pat. No. 4,305,080 uses an R/C network in each heater circuit to approximate past heating history of a resistor and set the next voltage pulse width accordingly. This might work with a two-level grey scale system, but it will not work with an "hour glass" shaped heater producing 32 melt sizes in one pulse and the 32 size system has several system nonlinearities that Cunningham cannot take into account.

For a black and white system, Anno et al., in U.S. Pat. No. 4,364,063, make corrections in pulse width based on the absence or presence of a previous pulse. However, his system cannot handle the nonlinearities of the 32 grey scale system. Ambient temperature correction is not provided in the Cunningham and Anno systems.

Minowa, in U.S. Pat. No. 4,113,391, describes a battery operated system with 7 resistors to produce two grey scales. Trouble with usable optical density occurs when the batteries run down, so the pulse width of all pulses are varied along with motor speed depending on battery voltage and temperature. There is no pulse width control based on thermal history.

Brescia, et al. in U.S. Pat. No. 3,777,116, describes a 7 heater two grey scale system. To avoid overheating of the resistors, the overall voltage supply for the resistors is controlled by the duty cycle of the resistors and individual resistor voltages are controlled by individual use rate. Although the duty cycle of all resistors may be thought of as a proxy for head temperature, there is no measurement of head temperature. This approach is certainly not applicable to a system which needs 1% temperature accuracy.

Ito et al., in U.S. Pat. No. 3,975,707, describes a 4×5 heater matrix where ambient temperature controls the on time of addressed heaters. No past history correction is provided.

OBJECT OF THE INVENTION

The object of this invention is to provide a control system for a thermal printer containing, for example, 2,728 "hour glass" shaped heaters on a 9–10 inch head or bar. The thermally written pixels produced by each heater will reliably respond to commands of 31 equal increment sizes of melt under normal office ambient air conditions. Warmup time is negligible and the 32 reliable shades of grey start when a just turned on system passes the "no write" white margin area and starts to write in the image area. Any electronics which must be placed in proximity to the heaters are minimal.

BRIEF DESCRIPTION OF THE INVENTION

The objectives above are met with a nonlinear clock controlling available "on-times" for voltage to each heater. These "on-times" are compared to a "melt size command" for that heater. Early in each cycle the "on-times" are used to "write" the desired pixel sizes and later in the cycle longer intervals of the nonlinear clock are used to control temperature compensation for each heater utilizing a second comparison to the same "melt size command" for that heater. In this process, for a given air temperature, and after stabilization, all 2,728 heater elements will return to the same starting temperature before the next "write" cycle, as this "calibrated system" maintains the cycle starting temperature of all resistors at the same value. Measuring the temperature close to an end resistor on the bar is close enough to approximate the temperature of all the resistors. This sensed temperature can be used in a "closed loop" control system to keep the desired starting temperature or each cycle at a desired value despite normal office air temperature changes. The time constant of this closed loop system can be adjusted so that the starting resistor temperature will be up to the desired value when the margin is passed and the image area is reached after the first "turn on" of the system.

In the above-mentioned co-pending application I disclose generally a clock for timing the current to the resistor heater head in a predetermined manner so as to assure, for example, equal dot size growth increments from 0 to 31 so as to produce the desired 32 grey scale values from fully white to fully colored.

One critical feature in assuring that there is repeatability and reliability in achieving accurate dot size and shape is the control of temperature at the heater head and particularly the accurate control of the temperature of each heater element. It should be understood, as explained in the above-referred to co-pending application, that, as power is applied to the heater element, the central or narrow part of the hour-glass shaped resistor will be the first to reach the temperature necessary to melt the appropriate area of the paper. At first, only a shallow melt wave is generated but as the power continues to be applied, the melt wave grows in both horizontal and vertical directions so as to produce ever increasing size dots. Until the dots are just tangent to one another, the increments of time necessary to produce equal increments of area increase are equal but thereafter the time must be characterized so as to take care of the fact that the dots will overlap one another up to the point where the diagonally positioned dots are tangent at which time the dots will completely be overlapped and the whole paper in that area will be colored. In the above-mentioned co-pending application the importance of assuring that the electrical conductors connect to the head are spaced away from the melt area so as to avoid conducting heat away is discussed.

The present invention will provide accurate control of the temperature of the head and the individual heaters or resistors in the head including compensation for changes in ambient temperature of the head which may occur due to, for example, changes in air temperature around the head, so as to further assure reliable and accurate control of the melt area size. In order to accurately control the temperature of the resistors, it is desirable that all of the heaters spaced across the width of the paper begin a cycle of printing from a predetermined, desired, fixed temperature. Then, as the resistors are energized, they will all follow the same heating curve initially, but because they are energized for different periods of time, they will have the power removed at different times and thus will cool on different curves depending upon the "on-time" of each heater. Accordingly, in the present invention I provide means for bringing each individual head temperature up to the predetermined value by applying a compensating current to each head at a time, prior to the next "write" portion of the cycle, which is dependent upon the amount of cooling which has taken place in that heater.

DETAILED DESCRIPTION OF THE PREFERRED EMBODIMENT

With an hour-glass shaped printing head system such as is shown in the above-mentioned co-pending application energy is supplied from a voltage source to the head in accordance with the timing from a clock. Assuming that 32 shades of color are desired, then, counting no dot at all as a first shade, 31 different dot sizes are needed with the largest size being able to color the entire paper. From dot size number 1 to dot size number 24, equal increments of "on time" produce equal increases in dot size. At dot size number 24, adjacent dots are just tangent and from thereon, the "on time" must be longer in order to get equal changes of grey scale because of dot overlapping.

Figure 1:
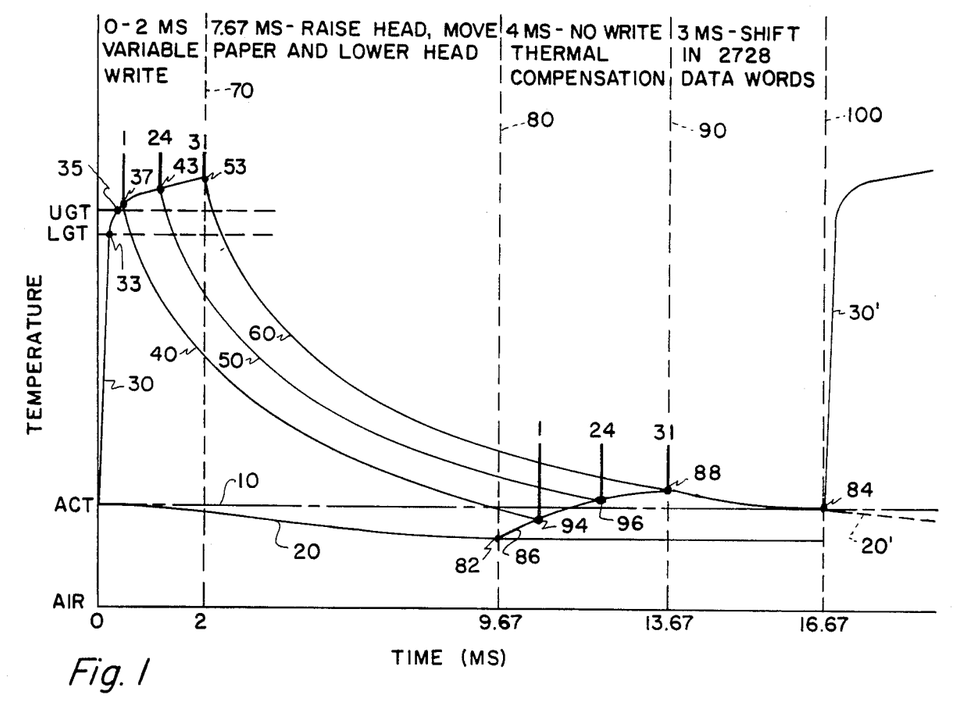
FIG. 1 is a graph showing the cycle of a resistive head being energized at different "on-times" and showing the cooling and compensating of the head at corresponding times.

In FIG. 1, a graph of time versus temperature is shown for one of the writing heaters spaced across the paper. In order to get high resolution it is desirable that a large number of heaters be used and, as previously indicated, in the preferred embodiment, 2,728 hourglass shaped resistors are used across the width of the paper, each of which is capable of producing a melt area which is one of 31 different predetermined sizes on the thermal recording paper which passes adjacent thereto. FIG. 1 shows how the response of one of these heaters changes with different "on times" and how different compensations must be applied in order to bring the heater up to a predetermined desired temperature at the start of a "write" cycle. In FIG. 1 it will be assumed that the heater under discussion has just left a previous dot on the paper and has cooled to the predetermined chosen starting temperature referred to herein as the ambient control temperature or "ACT" temperature shown as dash-dot line 10 in FIG. 1. If no dot at all is required on the next write cycle, then no energy is supplied to the heater and it will continue to cool from the ACT temperature along a curve 20 down towards the ambient surrounding temperature referred to in FIG. 1 as the "AIR" temperature. Compensation for changes in ambient temperature will occur automatically by virtue of circuitry to be described hereinafter.

Figure 2:
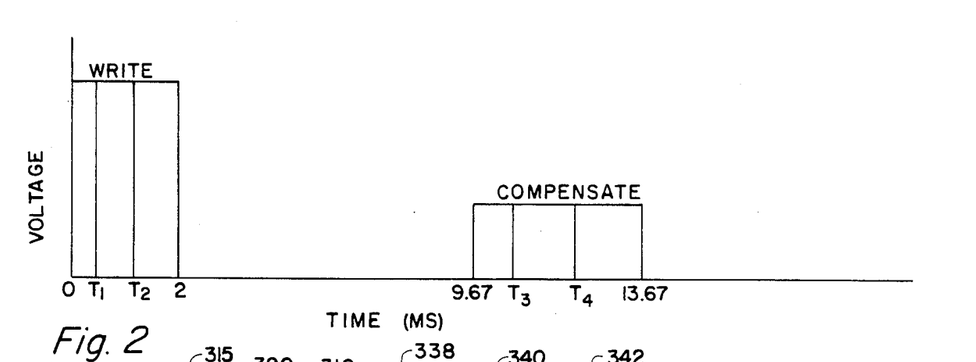
FIG. 2 is a graph showing the write and compensate voltages applied to the head in accordance with time.

If a dot of size number 1 is required, then the heater will be connected to the power source for a first predetermined time period and then disconnected from the power. In FIG. 1, a curve 30 shows how the heater temperature increases with "on time" from the "ACT" temperature up past the lower glass temperature "LGT" at point 33 where the thermoplastic part of the paper becomes "tacky" but does not melt, to the upper glass temperature "UGT" at point 35 where the melting of the thermoplastic starts. A short time thereafter, at point 37, the thermoplastic has melted to an extent necessary to produce a number 1 dot size. It should be noted that the temperature of the heater rises slightly above the upper glass temperature because the heat must pass through the metal of the head and a protective layer of plastic and then must provide for the latent heat of fusion of the thermoplastic. After the dot of size number 1 has been obtained at point 37, the power is removed and the heater will cool along a curve such as curve 40. In FIG. 2, the "write" voltage is shown to be applied from a time "0" to a time "$T_1$" so as to bring the heater to the desired temperature for a number 1 size dot.

If a larger dot is required, the power is applied for a longer time so that the melt area increases in size. The time to produce a number 24 size dot at point 43 in FIG. 1 is shown as "$T_2$" in FIG. 2 and after this time the heater will cool along a curve such as curve 50 in FIG. 1. If a dot of size number 31 is desired, the power will be applied to the heater for what is expected to be about two milliseconds as shown in FIGS. 1 and 2 until the point 53 is reached after which time the heater will cool down along a curve such as curve 60 in FIG. 1.

While only 3 dot sizes have been shown in FIGS. 1 and 2, it should be realized that there are many more sizes possible and, in the present example, 31 sizes of dot are expected so that between points 1 and 24 in FIG. 1 there will be 22 other points each of which will follow a curve similar to curves 40 and 50 but lying therebetween. Also between dot sizes 24 and 31 there will be 6 other points and these will cool down along curves similar to curves 50 and 60 but lying therebetween. It should also be noticed that the time between point 35 and point 43 is substantially equal to the time between point 43 and 53 but only 6 points lie between the latter compared to 22 between the former. This is because of the overlapping situation of the dots after size number 24 which was referred to earlier and discussed in the above-referred to co-pending application.

After the approximately 2 milliseconds for the 2,728 heaters to melt various size dots into the thermal recording paper, the head may be raised out of contact with the paper, the paper moved to the next position which, in the present case will be about 3.33 mil. (since this is the approximate distance between the 2,728 heaters across an approximately 8-inch width paper) after which time the head is lowered again. This time period is expected to be about 7.67 milliseconds as shown in FIG. 1 between dashed lines 70 and 80. Actually, the total time for a complete cycle is desired to be 16.67 milliseconds since that is the time equal to one television field scan. Working backwards from the 16.67 time period with the assumption that 2 milliseconds is required for the "write" cycle and 7 milliseconds will be required for compensation and data input, 7.67 milliseconds is arrived at for the period between dash lines 70 and 80.

After the 9.67 millisecond time identified by dashed line 80, any heater which had had no power applied to it would have cooled along curve 20 to a temperature represented by point 82. For purpose of the present example, it will be presumed that the desired starting temperature "ACT", represented by the dash-dot line 10, is the temperature to which a heater which has just written a dot the size of number 31 has cooled in time for the beginning of the next cycle so that no compensating power need be applied thereto. This is shown in FIG. 1 as point 84 at the end of curve 60.

In order for all of the heaters to arrive at a starting temperature represented by point 84, a compensating voltage must be applied to each cooling heater for a time period dependent upon its temperature (a value related to the size dot previously made and to the cooling curve such as 40, 50, or 60). The coolest heater will be one that made no previous dot and therefore cooled along curve 20. The hottest heater will be one which has just made a size number 31 dot and has cooled along curve 60. Accordingly, the "compensate" voltage shown in FIG. 2, which is of smaller size than the writing voltage, is applied to a heater that has cooled to point 82 along curve 20 at time 9.67 milliseconds. The temperature of that heater will then begin to rise along a curve 86, shown in FIG. 1 to be considerably slower than the fast rise of curve 30 when the larger "write" voltage is applied. The size of the compensating voltage is chosen so that the head will reach the temperature of the hottest head at point 88 about 4 milliseconds later at a time 13.67 milliseconds shown in FIG. 1 as dashed lines 90. Thereafter the head will again start to cool along curve 60 for about 3 milliseconds to point 84. This is set up to occur at the 16.67 millisecond time discussed above which is desired for the television field scan.

A slightly hotter heater, for example one which has previously printed a number 1 size dot and has cooled down along curve 40, will have to have a compensating voltage applied to it at a time $T_3$ shown in FIG. 2. In FIG. 1 this compensating voltage is applied to the heater at a point 94 at which time the heater will increase in temperature along the curve 86 to point 88 where the "compensate" voltage is removed and it, like the others, will again cool slightly to the "ACT" temperature at point 84. In similar fashion a yet hotter heater such as one which has just printed a number 24 size dot and has cooled down along curve 50 will have the "compensate" voltage applied to it at a time $T_4$ in FIG. 2 and at a point 96 in FIG. 1. This heater will also heat up along curve 86 to point 88 where the "compensate" voltage is removed and then it will cool slightly to point 84. The heater which has just printed a number 31 size dot and cooled down along line 60 will arrive at point 88 at the same time as all of the other heaters (about 13.67 milliseconds) and it along with all the of the other heaters will then cool along curve 60 from point 88 to point 84 and will not have to have any "compensate" voltage applied thereto. The heaters which printed dots of other sizes in between those that have been discussed herein and have cooled down along other curves similar to but in between curves 40 to 60 will have their "compensate" voltages applied at various times between 9.67 milliseconds and 13.67 milliseconds and will follow curve 86 to point 88 and then follow curve 60 to point 84 just as the others have done. During the period between 13.67 milliseconds, where the "compensate" voltage is disconnected from the heaters, and the time of 16.67 milliseconds (shown in FIG. 1 as dashed line 100) where the next write cycle begins, is approximately 3 milliseconds. During this time the computer or controller, to be described hereinafter, will load in the data words to each of the 2,728 heads to determine the time lengths for each heater to be on during the next "write" cycle.

The net result is that all of the heaters arrive at point 84 at the same time and all will be ready for the next "write" cycle shown by curve 30' in FIG. 1. Dashed line 20' shown in FIG. 1 shows the continual cooling of a heater that does not print a dot during the next cycle.

If the ambient "air" temperature changes, then, the temperature at the heater will change and in order to make all of the times exact, it is desired that the "ACT" temperature change accordingly. In order for this to occur, a temperature responsive device such as a thermistor may be attached to the writing head to sense the temperature and to provide a signal to a system to be described in connection with FIG. 5 so as to change the power applied to the heaters.

It should be understood that the various times described in connection with FIGS. 1 and 2 are, for example only, and are not to be considered absolute. The "write" time could be more or less than the 2 milliseconds described and so could the time to raise the head and move the paper and lower the head be different than the 7.67 milliseconds shown. In fact, with certain kinds of paper such as the die transfer paper discussed in the above-referred to co-pending application, it may not be necessary to raise the heads during the paper motion. Also, if more than one computer or controller were involved and the associated electronics matching the shift register were duplicated, the 3 millisecond shift of the 2,728 data words could be done by one computer or contoller while the other computer or controller was providing the control of the compensating voltage in which event, point 88 could be the "ACT" temperature and the beginning of the next "write" cycle.

Figure 3:
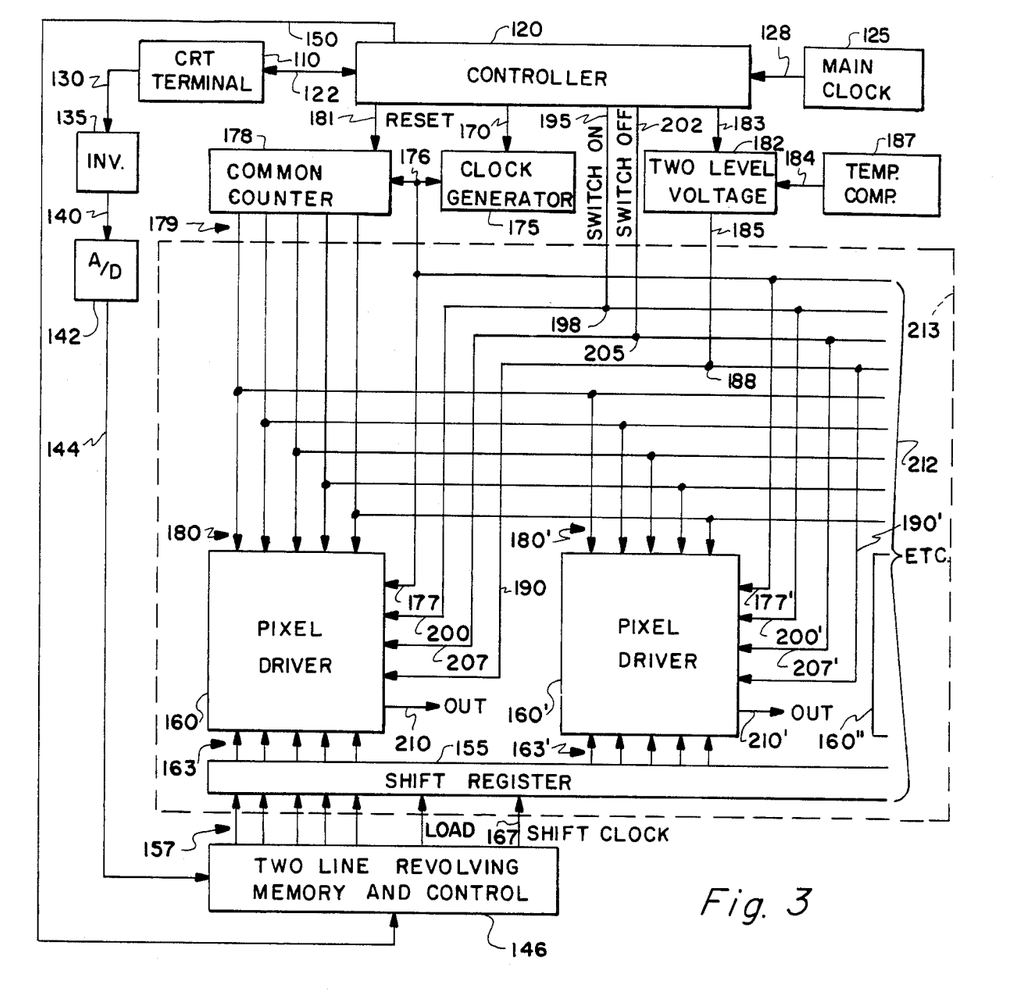
FIG. 3 shows a block diagram of a control circuit for controlling the energization of each head during the write and compensate portions of each cycle.

Referring now to FIG. 3, a circuit for applying the power to the individual writing heaters for the proper time period is described. In FIG. 3 it is assumed that the picture to be printed is being defined from a cathode-ray tube terminal shown in FIG. 3 as box 110. The terminal may be putting out signals at a scan rate for 512, 1024, or even 2048 scans per frame. A signal indicative of the scan rate and also the horizontal and vertical deflection times is presented to a computer or controller 120 by way of a line 122. Any command signals from controller 120 to CRT terminal 110 can also be presented by way of line 122. The controller also receives an input from a main clock 125 by way of a line 128 and with these inputs is capable of producing the proper signals for driving the circuits and controlling the heaters in the precise fashion desired.

The CRT terminal 110 may be black and white or color. If color, the output from the terminal appearing on a line 130 will likely be signals indicative of the colors red, green, and blue. Because the paper used with thermal recording usually requires the opposite colors, i.e., cyan, magenta, and yellow, the signal from the CRT terminal on line 130 is presented to an inverter 135 so that the signals may be reversed for use in the printer system.

The inverted signals from inverter 135 are presented by means of a line 140 to an analog-to-digital converter 142 which changes the signals to digital form for use by the system. In the preferred embodiment a five-bit digital word is used but other sizes may be employed. The digital signals are fed from the converter 142 by way of a line 144 to a two-line revolving memory 146 where two lines of digital scan from the CRT terminal 110 are stored.

Upon a signal from the controller 120 over a line 150, the two-line revolving memory 146 will shift the first line in its memory into a shift register 155 by way of a path shown as five lines 157. The next line from the CRT terminal 110 may then be fed into the two-line revolving memory 146 so as to be ready for the next signal from the controller 120 over line 150.

As will be recalled from FIG. 1, during the last approximately 3 milliseconds, between dashed line 90 and dashed line 100, the 2,728 heaters datum are loaded so as to be ready to write during the next cycle. A plurality of heater or pixel drivers 160, 160', 160'', etc. are shown having inputs from the shift register 155 on groups of five lines 163, 163', etc. A shift clock signal presented to the shift register 155 from the two-line revolving memory 146 on a line 167 is caused to occur by the controller 120 beginning at the 13.67 millisecond time identified as dashed line 90 in FIG. 1. When 2,728 words have been shifted into the shift register, the various data words are available to the various pixel drivers 160, 160', etc. This operation takes about three milliseconds so that the head will be ready for use when the next "write" cycle occurs.

Controller 120 has another output identified as line 170 which controls a clock generator 175 having an output leading to a junction 176. Clock generator 175 may be a programmable timer controlled to an accuracy of one percent or better by a microprocessor in the controller 120 and operates to produce two sets of 32 clock pulses: for "write" the duration is 2 milliseconds and for "compensation" the duration is 4 milliseconds for a given set as is seen in FIG. 1. In each set, the clock period will be characterized so as to produce output signals which are of substantially the same duration for the first 24 dot sizes and thereafter will vary in time by larger amounts up to dot size 31. More particularly, if the period between dot sizes 1 to 24 is 24T then to dot size 25 the time will be 25.12345T, to dot size 26 the time will be 26.57000T, to dot size 27 the time will be 28.33263T, to dot size 28 the time will be 30.52540T, to dot size 29 the time will be 33.35688T, to dot size 30 the time will be 37.40166T and to dot size 31 the time will be 48.69462T as is described in the above-referred copending application. These clock signals are presented from junction 176 to an input 177, 177', etc. of each pixel driver 160, 160', etc. and to a common counter 178. Common counter 178 produces a binary coded signal indicative of the actual time from clock generator 175 and this signal is present by way of a set of five lines 179 to inputs 180, 180', etc. of the pixel drivers 160, 160', etc. as will be further discussed in connection with FIG. 4 below. At the end of a cycle, a "RESET" signal from controller 120 to counter 178 by way of a line 181 will reset the counter to zero in readiness for the next cycle.

It will be recalled in FIG. 2 that the voltage used for writing is substantially higher than the voltage used for compensating and accordingly in FIG. 3 a two-level voltage source 182 is shown connected to the controller 120 by a line 183. The two-level voltage source 182 also receives an input on a line 184 from a head temperature compensating circuit 187 (to be described in connection with FIG. 5). The signal on line 184 is used to control the size of the voltages in accordance with changes in the ambient head temperature. The output from the two-level voltage source 182 is presented by way of a line 185 to a junction point or terminal 188 and from terminal 188 to the various pixel drivers 160, 160', 160'', etc. by way of lines 190, 190', etc. When the controller determines that a "write" signal is called for, a relatively higher voltage will appear at terminal 188 and be presented via lines 190, 190', etc. of each of the pixel drivers. When the controller determines that a lower "compensate" voltage is required, the signal on terminal 188 presented to the various pixel drivers via lines 190, 190', etc. will be at a lower level.

Controller 120 also produces an output on a line 195 which is identified as a "SWITCH ON" signal and is presented to a junction point or terminal 198. The "SWITCH ON" signal is used to advise the pixel drivers when a new write-compensate sequence is to be started for all heaters. The "SWITCH ON" signal is presented to the individual pixel drivers from junction point 198 over lines such as 200, 200', etc.

An output from controller 120 identified as a "SWITCH OFF" signal is conducted by a line 202 to a junction point or terminal 205. The "SWITCH OFF" signal is used by the pixel drivers to terminate the "compensate" voltage and allow shift register filling before the next "write" signal is started. The "SWITCH OFF" signal is presented from terminal 205 to the various pixel drivers over lines such as 207, 207', etc.

The output from the pixel drivers 160, 160', etc. is shown as an arrow 210, 210', etc. and these signals are presented to the individual heaters such as the hour glass shaped resistors of the above-referred to co-pending application.

While only two pixel drivers have been shown in FIG. 3, there will be, in the present example, 2,728 pixel drivers connected to shift register 155 as is shown by the brace 212 at the right side of FIG. 3 leading from the various connections onwards to the right. All of the electronics within a dashed line box 213 of FIG. 3, including the pixel drivers 160, 160', etc. and the shift register 155 would normally be part of the integrated circuits on the writing head along with the individual resistor heaters while the remainder of the apparatus would be located remotely. If the distances are very large, it may be desirable to include the common counter 178 on the head.

Figure 4:
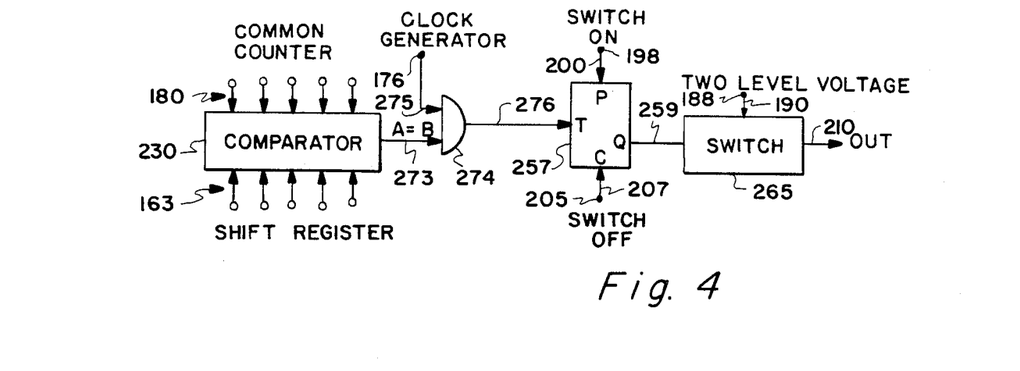
FIG. 4 is a block diagram of the pixel driver of FIG. 3.

FIG. 4 is a block diagram of the interior of one of the pixel drivers such as 160 of FIG. 3. During a "write" cycle the pixel driver turns on the "write" current to the resistor for a time related to the value of the number in the shift register. During a "compensate" cycle the pixel driver turns on the compensate current for a time inversely related to the value in the shift register. Consider the start of a new write-compensate cycle for a pixel. The shift register will have been loaded and valid data therefrom will appear at a comparator 230 on lines 163. The high voltage write level is on terminal 188 from the two level voltage source 182 of FIG. 3. The "write" cycle starts with a "SWITCH ON" signal from controller 120 of FIG. 3 at terminal 198 which turns on a toggle flip-flop 257 at the P terminal thereof in FIG. 4. This produces a signal at the Q terminal of flip-flop 257 on line 259 and operates to turn on a switch 265. With switch 265 on, the high level voltage on line 190 is presented to the resistor heater connected to line 210 and the resistor starts to heat. At the same time, the clock generator 175 in FIG. 3 sends "write" clock pulses to the common counter 178 which are presented to comparator 230 in FIG. 4 on lines 180. When the value in the counter as seen on lines 180 is equal to the value in the shift register as seen on lines 163 then the comparator 230 sends an A=B signal on a line 273. An AND gate 274 receives the signal on line 273 as one input and synchronizes the A=B signal with a second input from the clock generator 175 of FIG. 3 on a line 275. When the A=B signal is present on line 273, then the next pulse from the clock on line 275 produces an output pulse from AND gate 274 on a line 276. The signal from the AND gate 274 on line 276 is connected to the T input of flip-flop 257 and toggles flip-flop 257 so as to change the output at the Q terminal thereof. The change on line 259 now turns the switch 265 off and removes the voltage to the heater resistor on line 210. Thus, during the "write" cycle, the high voltage is applied to the heater resistor from a time starting with the "SWITCH ON" signal from controller 120 and ending with the A=B signal after the value in the counter 178 equals the value in the shift register 155, at which time the switch 265 is turned off. At this point, the heater begins to cool and then the head is raised, the paper moved and the head lowered as was explained in connection with FIG. 1. Also a signal from controller 120 in FIG. 3 will present a "reset signal" to the common counter 178 to reset it to zero and a signal from controller 120 on line 183 will set the two level voltage source 182 at its lower or "compensate" level. If a 32 value counter is used, then the "reset signal" to common counter 178 would not be necessary except at the initial start up. At other times the counter would automatically return to zero after counting 32. When it is time for the "compensate" cycle to begin, a signal from controller 120 on line 170 will cause the clock generator 175 to count again, this time at a slower rate. During the compensate cycle the counter 178 will again count up to the number in the shift register 155 and when the two are again equal, an A=B signal will again appear on line 273. Thus the next clock pulse from the clock generator on line 275 will produce an output pulse from AND gate 274 on line 276 thus causing the flip-flop to toggle and change the Q output on line 259. The change of signal on line 259 causes the switch 265 to again turn on and apply the now lower voltage to the heater resistor connected to line 210. The switch is turned off at the end of the compensate cycle by a switch off signal from controller 120 on line 207.

Thus, during compensation, switch 265 is off from the beginning of the cycle until the time when the signal from common counter 178 is equal to the previously existing signal from shift register 155 and is then turned on. This is seen to be the inverse of the write cycle where the switch 265 is on until the counter from the common counter and the shift register are equal and is then turned off. If the number in the shift register is 31, the operation proceeds as above but there is no compensation current because the switch off signal is produced during the last pulse from the clock generator 175 that would make the output from common counter 178 equal the output from shift register 155. If the number in the shift register is zero, the "write" current will be turned on for a brief insignificant instant but can be ignored for it will be less than the 1% noise margin and it can be compensated for by decreasing the compensation cycle start clock.

The only electronics that must be placed on the bar containing the hour glass shaped heaters is, for each heater: 5 bits of the shift register, the comparator, the AND gate, the flip-flop, and the switch.

It should also be understood that if CRT terminal 110 is producing a scan of 2048 lines, then the pixel drivers 160, 160', etc. will be laying down single dots corresponding to the pixels emerging from the CRT terminal 110. If, on the other hand, the CRT terminal were to produce a scan of 1024 lines, then the pixel drivers 160, 160', under the control of controller 120 would operate so as to put down two dots for each pixel emerging from CRT terminal 110 and would repeat the process for the next line. More specifically, pixel drivers 160 and 160' would both lay down a dot of the first pixel size emerging from CRT terminal 110 while the next two pixel drivers would lay down the same size dot representing the pixel size coming from the second pixel of CRT terminal 110. Then when the paper moved to the next line the exact same signal would control pixel drivers 160 and 160' to produce two more dots of the first pixel size etc. Thus after a memory line was layed down there would be four dots representing the output from pixel from the CRT terminal 110. Finally, if the CRT terminal 110 produced a scan of 512 lines, then the first four pixel drivers in the system would produce the same output representative of the size of the first pixel from CRT terminal 110 and the next four would lay down four more equal size dots representative of the second pixel coming from CRT terminal 110. Then at the end of the line the pixels would repeat the process four times so that on the final line each pixel from CRT terminal 110 would be represented by 16 individual dots of the same size. The 2 line revolving memory and control performs any bit repeat and line repeat with commands from controller 120 via line 150. For color operation the controller 120 causes the CRT terminal 110 to first send red data to the inverter 135, the A/D converter 142, and the 2 line revolving memory 146 after which the operation proceeds as described above until the full raster is completed. Then the controller causes the CRT terminal 110 to send a page of green data and finally a page of blue data is sent. With 32 different shades available for each color and with the pixels accurately superimposed, each pixel can have as many as $32 \times 32 \times 32 = 32,768$ different shades of color.

Figure 5:
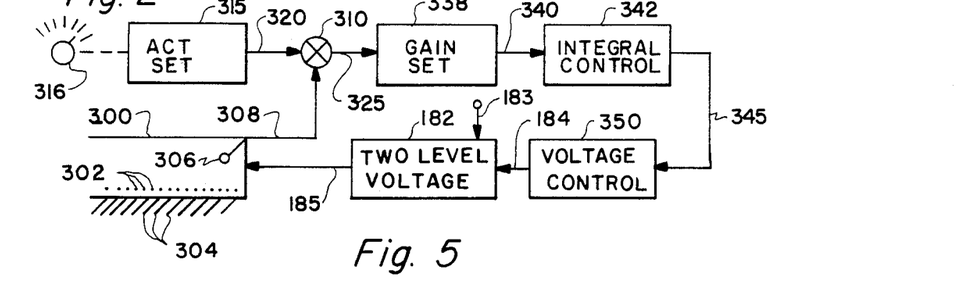
FIG. 5 is a block diagram of a circuit for controlling the compensation voltage in accordance with changes in ambient temperature.

In FIG. 5, a circuit which compensates for changes in ambient temperature or startup temperature transients is shown. The head, shown in FIG. 5 by reference numeral 300 shows the plurality of heater elements as dots having reference numeral 302 and a heat sink shown by slanted lines 304 is shown operable to conduct heat away from the head. The head also has the electronics of dashed line 213 of FIG. 3 thereon including the elements of FIG. 4 but not shown in FIG. 5 for clarity. A temperature sensor 306 is attached to the head and senses the temperature around the individual heater elements. A signal from temperature sensor 306 is presented by way of a line 308 to a difference circuit 310. A box labelled "ACT SET" is identified in FIG. 5 by reference numeral 315 and may consist of a potentiometer having a wiper moved by a knob 316 so as to produce a signal of magnitude representative of the desired control ACT temperature shown in FIG. 1 as the dot-dash line 10. By setting the voltage from the "ACT SET" 315, a signal is produced on a line 320 which is presented to the difference circuit 310. If the signal on line 320 is different than the signal on lin 308, the difference between the two appears as an output on a line 325 which is presented to a gain set amplifier or circuit 338 that is preset to a desired value to control the gain of the signal around the loop to be described. The output from the gain set circuit 338 appears on a line 340 and is presented to an integral control circuit 342. Integral control circuit 342 operates to integrate the signal on line 340 and to produce a time delay so that the circuit does not respond to random and rapid changes in temperature. The output of the integral control circuit 342 is presented by a line 345 to the compensation voltage control circuit 350 whose output on line 184 is connected to the two level voltage unit 182 having an input from the controller 120 of FIG. 3 on line 183. The output from the two level voltage control 182 is on line 185 and connected to the pixel driver circuits on the head 300 as described in connection with FIGS. 3 and 4. This system controls both the "write" and "compensation" voltages of FIG. 2.

Without the closed loop compensation of FIG. 5, the system would be a "calibrated system" and at any one operating air temperature, the "write" voltage and the "compensate" voltage would be adjusted so that the "ACT" temperature would be maintained. The "write" time needed to reach upper glass temperature would be as desired and the 32 shades of grey would be provided since, in this ideal situation there would be no unexpected heating of the head. In such case, each resistor would be individually compensated to return to a constant temperature and good registration for all pixels over all colors would be provided. However, even with no ambient changes, the time necessary to bring the head initially up to a stable starting temperature would be longer than desired. Also large changes in air temperature do occur in which case the system "write" and "compensate" voltages would have to be recalibrated for each change.

With the closed loop of FIG. 5, fast temperature stabilization and automatic adjustment to changing air temperatures is provided. The temperature of the head 300 is controlled in FIG. 5 by raising and lowering of the voltage from the two level voltage source 182. With higher voltages applied, the temperature of head 300 will rise and with the lower voltages applied, the temperature will fall. There are, of course, upper and lower limits for the voltage from the two level source 182 to be useful but these limits still allow adequate heating and cooling of the head 300 to keep its temperature at a desired value for normal office operating temperatures. The ACT set 315 is set and locked to a value which corresponds to the ACT which, for the highest air ambient expected to be encountered when the heat sink can dissipate heat faster than it is taken in at the lowest limits for "write" and "compensate" voltages. At the other extreme, the "ACT" set is also consistent with lowest air temperature expected to be encountered at the highest "write" and "compensation" voltages generating head heat faster than the heat sink loses heat. Over this air temperature, heat sink and voltage range, the time to reach upper glass temperature will be substantially constant. Upon initial startup the highest voltage will be applied from the two level voltage source 182 to the head which is at its lowest temperature and will thus bring head temperature to the desired ACT temperature during the time that the head passes over the no-write margin before reaching the image write area.

Consider first the operation of the closed loop integral controller of FIG. 5 after initial turn-on of the system. The head is at the top of the paper in the white upper margin and the head temperature sensor 306 will be at the ambient air temperature while the ACT desired temperature will be at a much higher value so that differential 310 receives a large signal from the ACT set 315 and a small signal from the sensor 306. Under these conditions the output from differential 310 will be a large positive signal. This signal is amplified by the gain set amplifier 338 and presented to the integral control 342. The integral control may be thought of as a motor driven potentiometer with a positive voltage output. The large positive voltage from the gain set 338 causes the motor to drive rapidly in a direction to increase the positive output of the potentiometer. The output of the integral control controls both the level of the write voltage and the compensate voltage of the two level voltage controller, 182. While the head is in the margin area, only "compensate" voltage is applied to the resistors. Quickly the integral control causes a maximum compensate voltage to be applied to the head resistors starting a temperature rise of the head and therefore a rise in the output of sensor 306 to occur. When the head temperature rises to slightly above the set ACT temperature, a small negative value occurs at the output of the differential 310 which is sent to the integral control 342 causing it to slowly reduce the control voltage to the two level voltage 182 which in turn causes a reduction in the "write" and "compensate" voltages. The reduction in the "compensate" voltage starts to lower the temperature of the sensor 306 and this continues until the differential output reaches zero. The new compensation voltage is just proper to maintain the head at the set ACT temperature. All of this occurs while the head is in the white margin area. After the margin traverse is completed the proper "write" voltage will have been set to reach the upper glass temperature at the proper time and write a 31 size pulse in 2 ms. Thus, the closed loop integral controller of FIG. 5 provides fast warmup of the head so that by the time the margin is passed and writing starts in the image area, the head is at ACT temperature within about 1% and the 32 shades of grey can be written reliably.

If the air temperature suddenly rises significantly, the heat sink will be unable to dissipate the same amount of heat and head temperature will begin to rise. This temperature rise will be sensed by 306 and the output from differential 310 will become negative. This will cause the integral control 342 to output a less positive voltage and the voltage control 350 will cause a drop in both "write" and "compensate" voltages from the two level source 182. This will cause less heat input to the head. When this less heat to the head balances the lower heat output from the heat sink, the head temperature will again stabilize. Note that this operation will occur even if all resistors are writing 31 size dots continually.

In FIG. 5, as just discussed, the temperature servo loop is "closed" through the two level voltage unit 182. Similar operation could be provided by closing the servo loop through the clock generator 175 of FIG. 3. In this case a positive increasing or decreasing output from the integral control 342 would lengthen or shorten the cycle of the write clock sequence and thus produce the feedback for a balanced system.

A third method of closing the temperature servo loop could be used in which the head 300 is variably cooled in accordance with changes in ambient temperature. For example, the heat sink 304 could be provided with radiator fins which are serviced by air from a variable speed motor, or cooling of the heater bar 300 could be done with a peltier cooler. In this case the gain set 338 would have to include a polarity reversal so that when the temperature of sensor 306 became greater than the ACT SET output from differential 310 would become negative and the reversal in gain set would cause a positive voltage into the integral control. This would cause an increasing positive voltage into the blower to cool the heater bar more rapidly. Similar results would occur with the peltier cooler.

It should also be understood that the present system can work with a CRT terminal which operates in an interlaced fashion, i.e., one where every other line is first layed down and then alternate other lines are presented.

It is therefore seen that I have provided a system for accurately and automatically controlling the heat flow to individual heaters in a thermal printer so as to provide very accurate and consistent laying down of various sized dots with fast warmup and despite changing temperature conditions. Many changes will occur to those skilled in the art and I do not wish to be limited by the specific disclosures used in connection with the preferred embodiment disclosed herein. I intend only to be limited by the following claims.

I claim:

1. In a thermal recording system having a succession of control cycles each containing a "write" portion and a "no write" portion, the system including a thermal recording heater, a first power source, and a second power source of magnitude less than the first power source, the first power source operable to energize the heater, during the "write" portion of a control cycle to increase the temperature of the heater to at least a first value that produces a melt in a thermally responsive recording medium positioned near the heater, the improvement comprising:

control means operable to control the time interval during which the first power source energizes the heater so as to produce a predetermined size of the melt and to interrupt the energization of the heater by the first power source thereafter so that the heater cools to a low value below the first value during the "no write" portion of the control cycle, and further means operable to energize the heater by the second power source during the "no write" portion of the control cycle to raise the temperature of the heater to a predetermined value below the first value prior to the "write" portion of the next control cycle.

2. Apparatus according to claim 1 wherein the magnitude of the low value depends on the time interval that the heater is energized by the first power source and the further means energizes the heater by the second power source starting at a time, prior to the "write" portion of the next control cycle, which depends upon the magnitude of the low value.

3. Apparatus according to claim 2 wherein the length of the time interval that the heater is energized by the first power source is one of a plurality of preselected "on times" and, after interruption of the energization thereof, the heater cools to proportionally lower low values for smaller "on times" and to proportionally higher low value for larger "on times" and wherein the further means energizes the heater by the second power source at proportionally earlier times for lower low values and at proportionally later times for higher low values so that the heater reaches the predetermined value at a predetermined time prior to the "write" portion of the next control cycle regardless of the length of the "on time".

4. Apparatus according to claim 3 further including temperature compensation means connected to the first and second power sources so as to increase and decrease the magnitudes thereof in accordance with changes in ambient temperature around the heater.

5. Apparatus according to claim 4 wherein the temperature compensation means includes a temperature sensor mounted proximate the heater to produce a first output signal which varies with the temperature sensed by the sensor, and control means connected to receive the first output signal and to adjust the magnitude of the first and second power sources in accordance therewith.

6. Apparatus according to claim 5 wherein the temperature compensation means further includes adjustable means for producing a second output signal of a desired value and wherein the control means includes a differential means to receive the first and second output signals to produce a difference signal which is used to adjust the magnitude of the first and second power sources in accordance therewith.

7. Apparatus according to claim 6 wherein the control means further includes integration means to integrate the difference signal so as to prevent rapid changes therein.

8. Apparatus according to claim 7 wherein the control means further includes gain set means to receive the difference signal and produce an amplified difference signal of predetermined gain which is presented to the integration means.

9. Apparatus according to claim 1 wherein the control means includes:
- comparator means having first and second inputs and producing an output signal when signals at the first and second inputs are equal,
- memory means connected to the first input to supply a signal indicative of the desired time interval necessary to produce the predetermined size of the melt,
- timing means connected to the second input to supply a signal indicative of an actual time interval, and
- switch means having an output connected to the heater, having a first input connected to the first power source, having a second input connected to the comparator means and operable by the output signal to change between a first condition wherein the heater is connected to the first input to a second condition wherein the heater is disconnected from the first input.

10. Apparatus according to claim 9 wherein the further means operates in accordance with a control signal to substitute the second power source for the first power source connected to the first input of the switch means.

11. Apparatus according to claim 10 wherein the switch means has a third input, and a fourth input, and a signal on the third input operates to place the switch in the first condition and a signal on the fourth input operates to place the switch in the second condition.

12. Apparatus according to claim 11 including controller means that produces a signal at the third input of the switch at the beginning of the "write" portion of the control cycle, produces the control signal to the further means after the end of the "write" portion of the control cycle, and produces a signal at the fourth input of the switch before the beginning of the "write" portion of the next control cycle.

13. Apparatus for use with a thermal printer having a head with a plurality of heaters thereon mounted for use proximate a paper having a meltable surface, a source of power of a first magnitude connected to energize a first predetermined group of heaters during any first position of a plurality of successive print cycles so as to increase the temperature of the first predetermined heaters to a first value sufficient to produce a melt in the meltable surface adjacent each of the first predetermined heaters and for a first time period of length which varies with the area of the melt desired, and after producing a melt of a desired size, removing the first magnitude power from such heater so that the temperature thereof decreases for a second time period to a second value insufficient to produce a melt in the meltable surface, comprising:
- a source of power of a second magnitude less than the first magnitude; and
- application means operable to energize a second predetermined group of heaters by the power of the second magnitude for a third time period sufficient to increase the temperature of each of the second predetermined heaters to a third value greater than the second value and less than the first value prior to the first portion of the next successive print cycle.

14. The apparatus of claim 13 wherein the first predetermined group of heaters are those of the plurality of heaters that are adjacent an area of the paper where a melt is desired and the second predetermined group of heaters are those of the plurality of heaters that have cooled below a predetermined temperature.

15. Apparatus according to claim 14 further including storage means having a first output indicative of a desired first time period for heating each of the first predetermined heaters;
- timing means having a second output which varies with elapsed time;
- comparing means for each of the first predetermined heaters connected to receive the first and second outputs and to produce a third output when the first and second outputs are equal; and
- operating means for each of the first predetermined heaters connected to receive the third output and to remove the first magnitude power from the heater associated therewith in accordance with the third output.

16. Apparatus according to claim 15 wherein each of said operating means includes switch means connected to the sources of power of the first and second magnitudes and to the comparing means to receive the third output, the switch means, in a first condition, operates to connect the first magnitude power to the associated heater, in a second condition operates to disconnect the first magnitude power from the associated heater, in a third condition operates to connect the second magnitude power to the associated heater, and in a fourth condition operates to disconnect the second magnitude power from the associated heater;
- control means connected to the switch means and operable to transmit first and second control signals thereto, the switch means being placed in the first condition upon receipt of the first control signal, the switch means changing to the second condition upon receipt of a third signal, the switch means changing to the third condition upon receipt of the next third signal and the switch means changing to the fourth condition upon receipt of the second control signal.

17. Apparatus according to claim 16 further including temperature sensing means on the head to produce a temperature signal and means connected to receive the temperature signal and to raise and lower the magnitudes of the sources of power in accordance therewith to compensate for low startup temperatures and changes in ambient temperatures around the head.

18. Apparatus according to claim 17 further including means settable to produce a signal representing a desired temperature and differential means connected to receive the signal representing a desired temperature and the temperature signal and operable to produce a resultant signal indicating the difference therebetween, and the means connected to receive the temperature signal includes a control device connected to the source of power to raise and lower the magnitudes of the sources of power in accordance with the resultant signal.

19. A method of thermal printing in a plurality of succesive print cycles with a plurality of heaters to be selectively energized and a thermally responsive paper adjacent thereto comprising the steps of:
- raising the temperature of first selected heaters during a first time period at the start of each print cycle to a value sufficient to produce a change in the paper in an area adjacent each selected heater;
- lowering the temperature of the first selected heater during a second time period of each print cycle to a second value below the first value after the changed area is of a desired size; and raising the temperature of second selected heaters during a third time period of each print cycle to a third value above the second value and below the first value so that the plurality of heaters are at substantially a predetermined temperature before the beginning of the next cycle.

20. The method of claim 19 further including the step of increasing and decreasing the temperature of the plurality of heaters when the ambient temperature around the plurality of heaters falls and rises respectively.

* * * * *

UNITED STATES PATENT AND TRADEMARK OFFICE
CERTIFICATE OF CORRECTION

PATENT NO. : 4,523,203

DATED : June 11, 1985

INVENTOR(S) : WILLIAM M. ADKISSON & RICHARD W. ADKISSON

It is certified that error appears in the above-identified patent and that said Letters Patent is hereby corrected as shown below:

Column 15, line 43, cancel "position" and substitute

--portion--.

Signed and Sealed this

Seventeenth Day of September 1985

[SEAL]

Attest:

DONALD J. QUIGG

Attesting Officer

Commissioner of Patents and Trademarks—Designate